United States Patent
Balvanz et al.

(10) Patent No.: US 9,090,041 B2
(45) Date of Patent: Jul. 28, 2015

(54) CADEN EDGE WELDING PROCESS

(71) Applicant: U.S. Manufacturing, Eldora, IA (US)

(72) Inventors: Loran R. Balvanz, Eldora, IA (US);
Paul R. Gray, Eldora, IA (US)

( * ) Notice: Subject to any disclaimer, the term of this patent is extended or adjusted under 35 U.S.C. 154(b) by 0 days.

(21) Appl. No.: 13/624,055

(22) Filed: Sep. 21, 2012

(65) Prior Publication Data
US 2013/0252023 A1    Sep. 26, 2013

Related U.S. Application Data

(60) Provisional application No. 61/538,451, filed on Sep. 23, 2011.

(51) Int. Cl.
*B32B 3/02* (2006.01)
*A01B 15/02* (2006.01)
*A01B 15/04* (2006.01)

(52) U.S. Cl.
CPC . *B32B 3/02* (2013.01); *A01B 15/02* (2013.01); *A01B 15/04* (2013.01)

(58) Field of Classification Search
CPC ................................. A01B 15/02; B32B 3/02
USPC ........ 51/307, 309; 428/698; 37/366, 379, 460
See application file for complete search history.

(56) References Cited

U.S. PATENT DOCUMENTS

| | | | | |
|---|---|---|---|---|
| 3,630,699 A | * | 12/1971 | Catlin | 51/309 |
| 3,635,271 A | * | 1/1972 | Markham | 241/222 |
| 6,327,970 B1 | * | 12/2001 | Kooima et al. | 99/519 |
| 7,677,843 B2 | * | 3/2010 | Techel et al. | 407/119 |
| 7,992,371 B2 | * | 8/2011 | Rieck et al. | 56/104 |
| 8,105,692 B2 | * | 1/2012 | Dumm et al. | 428/408 |

FOREIGN PATENT DOCUMENTS

| | | | |
|---|---|---|---|
| DE | 2910962 | * | 9/1980 |
| EP | 0341528 | * | 11/1989 |
| GB | 2170226 | * | 7/1986 |
| GB | 2176683 | * | 1/1987 |
| GB | 2264033 | * | 8/1993 |

* cited by examiner

*Primary Examiner* — Archene Turner
(74) *Attorney, Agent, or Firm* — Daniel A. Rosenberg; Briggs and Morgan, P.A.

(57) ABSTRACT

A method and apparatus for applying a wear coating to the back side of a wear part.

14 Claims, 3 Drawing Sheets

Figure 1a
Figure 1b
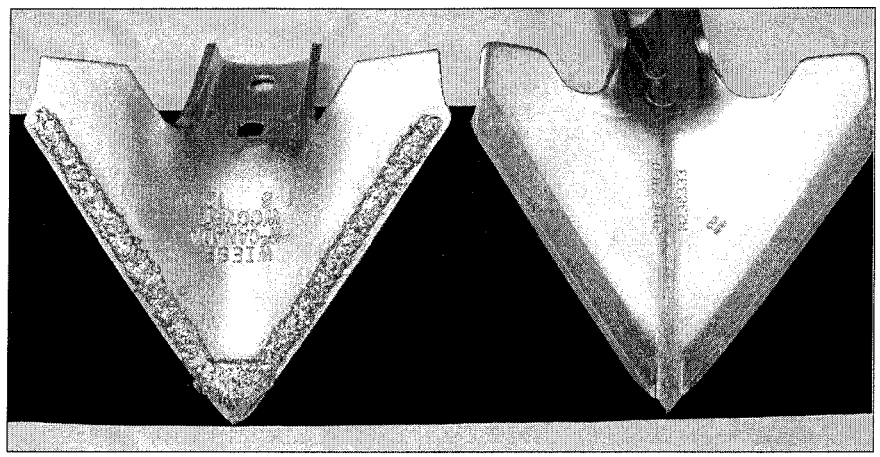
Figure 2
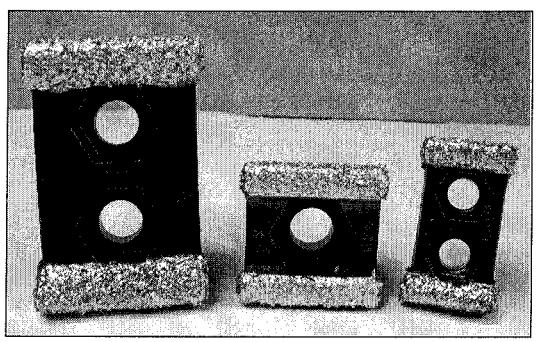

CADEN EDGE WELDING PROCESS

RELATED APPLICATIONS

The present application claims priority to, and incorporates by reference hereto, U.S. Provisional Patent Application No. 61/538,451 filed on Sep. 23, 2012.

BACKGROUND OF THE INVENTION

1. Field of the Invention

This invention relates to an apparatus and method for applying a wear coating to the back side of a wear part.

2. Background

Wear parts such ground engagement tools used in agricultural applications such as plow sweeps and rippers, as well as other wear parts, are subject to extreme wear and tear. These parts are as a result frequently replaced as they deteriorate to the point where they are no longer effect at the intended task. This occurs because the leading face, which does the bulk of the work, becomes dull from abrasion and wears away dramatically limiting the effectiveness of the part.

The part then requires replacement, which involves expense and down time. The problems of wear and replacement have been somewhat ameliorated by the use of wear resistance coatings placed on the working face of the wear parts. These coatings are very dense and resistant to abrasion. Tungsten carbide is a common wear resistant coating used for extending the life of such wear parts.

In the prior art, the leading face (the face that undergoes the most wear) is coated with a wear resistant coating. This will extend the life of the tool, but it has the drawback of making it a less effective cutting tool. Wear resistant coatings, such as tungsten carbide, are very dense and thick. As a result, they interfere with the flow of the material over the leading face of the wear part. Also, they dull the leading face reducing the cutting, or tearing, effect of the face.

In some prior art applications, the both the leading and back side face of the wear part are coated with a wear resistant coating. There is no disclosed advantage of coating both sides, and such parts suffer from the same disadvantages as parts with coatings on the leading face. Thus, coating both sides appears to do nothing to enhance the tools but is a waste of wear coating.

Accordingly, a need exists for a wear coating that will extend the life of a wear part but not interfere with the effective use of the tool.

SUMMARY OF THE INVENTION

An object of the present invention is to provide a wear part with a wear resistant coating that substantially eliminates the problems of the prior art.

These and other objects of the present invention will become apparent to those skilled in the art upon reference to the following specification, drawings, and claims. To that end, the present invention comprises a wear part with a leading face and a back face, wherein the back face is coated with wear resistant coating.

BRIEF DESCRIPTION OF DRAWINGS

FIG. 1a shows back face of a plow sweep.
FIG. 1b shows the leading (front) face of the plow sweep.
FIG. 2 shows various hammer tips.

DETAILED DESCRIPTION OF THE PREFERRED EMBODIMENTS

The present invention involves the addition of Tungsten Carbide chips to the molten puddle of a MIG weld. A fine to coarse grit carbide can be used for different applications. It is preferred that the weld puddle be as fluid as possible for best results. This restricts the welding to a horizontal plane only. The part being welded must be flat and level, or a positioner can also be incorporated. A robot can move a part under a stationary MIG gun and carbide feeder, instead of moving the welding head. This will allow application of the weld efficiently to a curved or multi faceted part with minimal handling. This is also important in applying the weld in a manner that best protects the high wear areas. By concentrating on the initial points of wear, the life of the parts is extended with a minimal amount of weld. This invention is particularly applicable to "ground engagement" tools such as rippers and sweeps, specifically in the agriculture market. Previously, hard face welding in many forms has been used in these fields with only moderate success. The invention is more broadly applicable to general wear parts such as hammers and hammer tips of the type used with rotary hammermills in tub grinders, and wear parts used in construction, mining, screening, conveying, crushing, plowing, road maintenance, and grader applications. These can include for example cutting faces, teeth, adapters, jaws, wedges, blades, and the like.

In prior art applications, the wear surface has been applied to the face of the tool (the side in full contact with the soil). In the present invention, application of a narrow weld to the back side of the leading face of these various tools achieves a much longer tool life than the prior art, and at a minimal cost. The present invention utilizes multiple stationary welding stations with the ability to apply both coarse and fine grit carbide welds to the same part without handling the part twice, and without changing anything with a welder.

Figure 3:
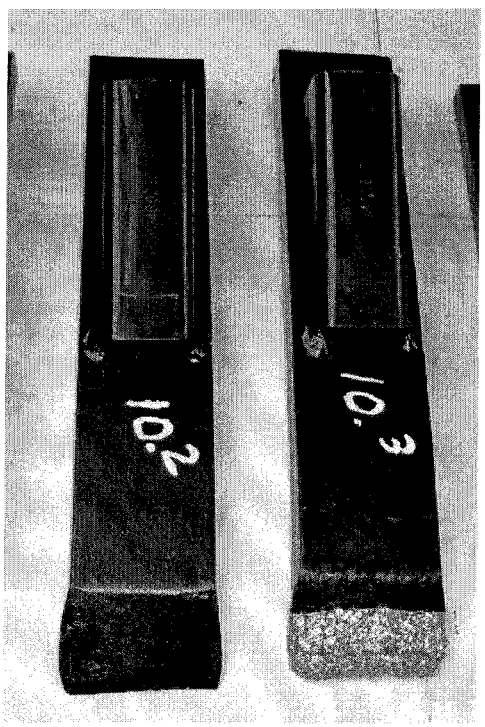
FIG. 3 shows the back face of a standard ripper and a ripper with wear coating.
Figure 4:
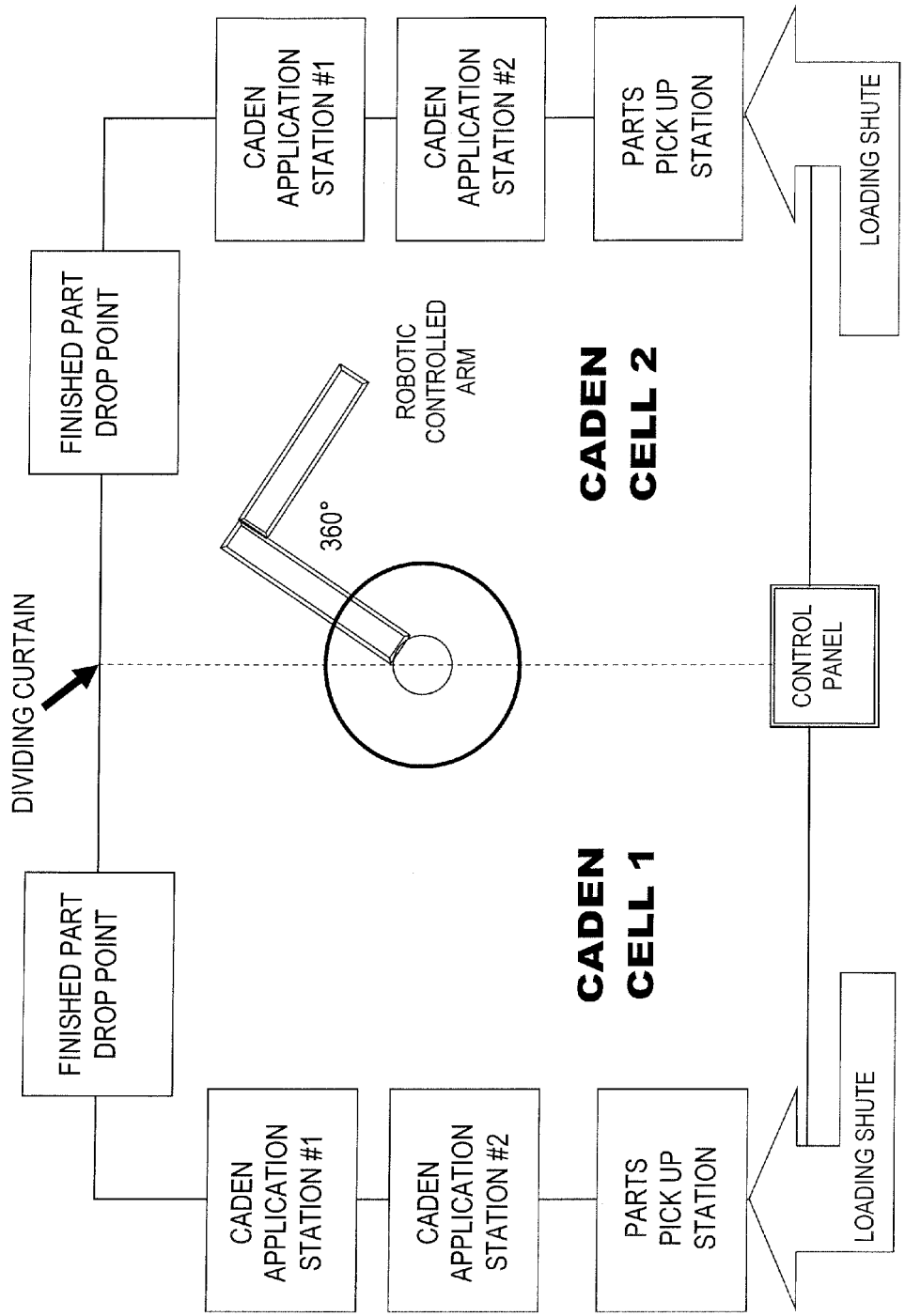
FIG. 4 is a flow chart of a welding process.

FIG. 1a shows the backside weld of the present invention applied to the backside of a plow sweep blade, comprised of tungsten carbide. FIG. 1b shows the reverse (leading) side of the plow sweep blade, which is not coated with any wear coating. FIG. 2 shows the backside of various wear parts with the weld applied. The wear parts are of the type used with a rotary hammermill of a tub grinder or the like. FIG. 3 shows the back face of a standard ripper blade and one with wear coating of the present invention.

Placing the wear coating on the back, non-impact surface, of the wear part produces surprising advantages. The presence of the wear coating on the backside supports the impact front side surface and better prevents wear than coating the front side. This is counter intuitive, and the prior art teaches away from such an approach. Additionally, in those situation where the sharpness of the face matters, coating the back side preserves a sharp cutting face. Coating the front side with a substance such as tungsten carbide defeats this advantage due to the fact that carbide coatings dull the face. Still further, the wear coating lasts longer since it is not in the path of abrasion as it would be with front side coating. Also, coating the back side reduces the amount of wear coating that needs to be applied in those cases where coating is applied to both sides of a wear part.

The welding cell welders of the present invention, because they are now stationary will be different and much more sophisticated as the speed and the heat levels and makeup of the matrix of weld and carbide mix can all be programmed to work in parallel with the robots programs.

Prior art welds are hard facing such that the abrasion wear is always put on the face of the working part that makes contact with soils or other contact surface, such as for digging, grind materials, or soil contacts. In many prior art applications, the solid carbide can only be applied to a flat and prepared surface, and the surface tends to shatter on impact with foreign objects, rocks and any abrasive material trying to be stirred, moved or conveyed.

By using a granule or other carbide weld matrix on the backside of the face to be protected the working face is actually reinforced, and made stronger. The weld does not allow the face to prematurely wear off, and does not diminish the flow of the material to be moved. As the part finally starts to wear, the weld does not wear and this tends to sharpen the face as the wear is forced to occur on front face or top.

Another advantage of the present invention comes from the fact that the welding process does not weaken or soften the forward working face of the wear part with our process. Studies have shown on typical hard surface coating that once a wear coating erodes the base material will then wear at an accelerated rate because it was softened in the weld process. The present invention solves this problem.

Studies have also shown that because the weld will not delaminate on impact and will only crack when the base material fails. This is not the case with the prior art welds. The weld of the present invention actually becomes part of the base material, thus creating a very durable face that almost cannot be removed with 4 to 10 times the wear of standard material.

The welding cell, shown in the flow diagram below, used to apply the welds of the present invention has the following properties:

1. It is computer-controlled robotics, with infinite variations for programming applications to many different parts of literally any wear surface that needs to be sustained in abrasion situations.

2. The present welding machine makes one pass at a described width and speed and then the jig is rotated by the operator holding the parts (usually six to ten parts at a time) and the welder makes another pass. Prior art welders and carbide applicators move on a linear line and weave the weld on the parts that are held in line side by side. The prior art welders must make four complete passes, and are manually rotated by the operator, until the top and front of each part has been covered. The operator then removes the parts from the jig, manually breaks them apart since the weld is continuous and holds the parts together. Then the parts move to a manual station where an operator manually applies welds to the corners and sides as needed by the customer. The manual welding is done one at a time and the welder, wire and carbide float above the part as the operator directs where the weld is to be put. In the present invention, the welder, wire and carbide applicator are all stationary.

2. A robot works on two-90 degree arcs.

3. The robot has two stations each working within a 90-degree arc actually creating two stations with one robot. While the robot is working on one 90 section, the operator can be setting up the robot for the next part to be welded. Thus, eliminating the down time between setups.

4. The welding station could even be set up with as many different carbide matrixes welders as desired to apply multiple coatings to the same part. For example, a first weld with one carbide mixtures and configuration of widths, and then a second weld and applicator at the same station with a different programmed width, size, and mixture.

5. The robot can be rotated to its other 90 degree arc two station set up position, and it begins work immediately while the operate loads the non working welding system.

6. By using this system, where the part is moved and completed in one pass, standard parts can be welded in one pass. This can be applied to any type of part, where the only change necessary is to change the fixtures used for the particular part, and a change to the program. For example, the system can be easily adapted to weld an Ag sweep, a bucket tooth hardfacing, or mixer blades for commercial mixers.

While the preferred embodiment of the invention has been described in reference to the Figures, the invention is not so limited. The present invention is adaptable and/or useful in the following applications and tools, agricultural ground engagement tools, seed openers plows points, sweeps, furrowers, knives, shovels, and shanks or any tool that makes contact with soils and that would benefit from preservation or prevention of damage to the leading point or face. Also, the present invention is applicable to commercial mixing blades, augers, or any application that where it would be helpful to extend the life of the leading face of such tools and apparatus. Construction applications are also applicable such as graders, blades, bucket teeth, and compactor teeth. The invention is more broadly applicable to general wear parts such as hammers and hammer tips of the type used with rotary hammermills in tub grinders, and wear parts used in construction, mining, screening, conveying, crushing, plowing, road maintenance, and grader applications. These can include for example cutting edges, teeth, adapters, jaws, wedges, blades, and the like.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods, and materials are described below. All publications, patent applications, patents, and other references mentioned herein are incorporated by reference in their entirety to the extent allowed by applicable law and regulations. In case of conflict, the present specification, including definitions, will control.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention. Those of ordinary skill in the art that have the disclosure before them will be able to make modifications and variations therein without departing from the scope of the invention.

The invention claimed is:

1. A ground engagement wear part comprising a front face and a back face opposite thereto, wherein a wear resistant coating is welded to the back face and the front face is uncoated.

2. The wear part of claim 1 where the wear resistant coating is tungsten carbide coating.

3. An engagement tool comprising a leading face and a back face, wherein only the back face is coated with a substantial thickness of wear resistant coating.

4. A method of coating a wear part with a wear resistant comprising coating only the back face of a wear part with a wear resistant coating.

5. The wear part of claim 1 wherein the wear resistant coating is confined to the bottom of the back face adjacent to the front face.

6. The wear part of claim 1 wherein the wear coating has a substantial thickness.

7. The wear part of claim 1 wherein the wear coating is applied without an annealing step.

8. The wear part of claim 1 wherein the wear coating extends the life of the front face by protecting the back face from wear.

9. The wear part of claim 1 wherein the wear coating does not interfere with the flow of material over the front face of the wear part.

10. The wear part of claim 1 wherein the application of the wear coating does not substantially change the ductility of the front face.

11. The wear part of claim 1 wherein the wear part is a ripper.

12. The wear part of claim 1 wherein the wear part is a sweep.

13. The wear part of claim 1 having an edge between the front and back faces, and said wear coating extends from the back face onto the edge.

14. A ground engagement wear part comprising a forward face and a leeward face opposite thereto, wherein a wear resistant coating is welded to the leeward face and the forward face is uncoated with wear resistant coating.

\* \* \* \* \*